United States Patent [19]
Krause et al.

[11] Patent Number: 6,099,875
[45] Date of Patent: *Aug. 8, 2000

[54] INDIVIDUAL SERVING SIZE CEREAL PACKAGE

[76] Inventors: Arthur A. Krause, 20539 Archwood St., Winnetka, Calif. 91306; Walter K. Lim, 14720 Horticultural Dr., Hacienda Heights, Calif. 91745

[ * ] Notice: This patent issued on a continued prosecution application filed under 37 CFR 1.53(d), and is subject to the twenty year patent term provisions of 35 U.S.C. 154(a)(2).

[21] Appl. No.: 09/208,550

[22] Filed: Dec. 9, 1998

Related U.S. Application Data

[63] Continuation-in-part of application No. 09/098,962, Jun. 18, 1998.
[60] Provisional application No. 60/078,181, Mar. 16, 1998.
[51] Int. Cl.[7] ............................ A21D 13/00; B65D 85/00; A23L 1/168
[52] U.S. Cl. ................................ 426/94; 426/96; 426/115; 426/619; 426/620; 426/621
[58] Field of Search ..................... 426/618, 619, 426/620, 621, 112, 115, 94, 96; 206/222

[56] References Cited

U.S. PATENT DOCUMENTS

| | | |
|---|---|---|
| 3,494,769 | 2/1970 | Tressler . |
| 3,578,459 | 5/1971 | Corbin . |
| 3,582,336 | 6/1971 | Rasmusson ................................. 99/83 |
| 3,992,556 | 11/1976 | Kovacs et al. . |
| 4,089,984 | 5/1978 | Gilbertson . |
| 4,485,120 | 11/1984 | Gantwerker et al. . |
| 4,585,664 | 4/1986 | Kohlwey . |
| 4,755,390 | 7/1988 | Calandro et al. . |
| 4,874,624 | 10/1989 | Conroy et al. . |
| 5,027,980 | 7/1991 | Bell ............................................ 222/94 |
| 5,035,914 | 7/1991 | Doerr . |
| 5,167,973 | 12/1992 | Snyder .................................... 426/115 |
| 5,251,758 | 10/1993 | Kolacek .................................. 206/542 |
| 5,496,575 | 3/1996 | Newarski ................................ 426/115 |
| 5,514,394 | 5/1996 | Lenahan .................................. 426/120 |
| 5,676,244 | 10/1997 | Green et al. ............................ 206/221 |
| 5,727,679 | 3/1998 | Newarski ................................ 206/222 |
| 5,753,289 | 5/1998 | Ness ....................................... 426/394 |
| 5,827,564 | 10/1998 | Bodkin, Sr. ............................. 426/620 |
| 5,894,027 | 4/1999 | Kazemzadeh .............................. 426/94 |

OTHER PUBLICATIONS

Scott Hegenbart; *Mastering the Morning: Creating Breakfast Cereals*;Jul. 1995; pp. 27–28, 32, 36, 39, 42, 45–46, 50–51; Food Product Design Magazine.

Elaine Knehr; *Bowl 'em Over: Adding Value to Breakfast Cereal*; Jun. 1997; pp. 103, 105, 109–110, 113–115–119; Food Product Design Magazine.

Kimberlee J. Burrington; *More Than Just Milk*; Jan. 1998; pp. 91–92, 95–96, 100, 105–106, 109–111; Food Product Design Magazine.

Lynn A. Kuntz; *Building A Better Breakfast Cereal*; Apr. 1998; pp. 34–36, 39, 41, 43, 45–46, 49–60; Food Product Design Magazine.

Kraft Promotional Brochure; *Kraft Non–Fat Dry Milk Alternates, Kraft Food Ingredients*.

*Primary Examiner*—Nina Bhat
*Attorney, Agent, or Firm*—Dennis H. Lambert

[57] ABSTRACT

An individual serving size cereal package containing a dry, ready-to-eat cereal, in which a quantity of dry cereal pieces are placed in a container with a dry milk product, such as dry powdered milk or milk substitute, and other additives, such as nutrients, sweeteners and flavorings, to form a food product that is nutritional and convenient to eat, and is also simple and economical to make.

21 Claims, 2 Drawing Sheets

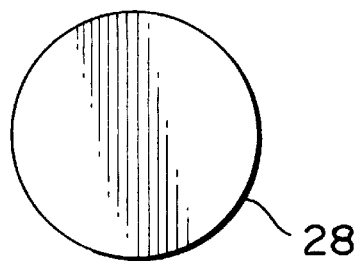
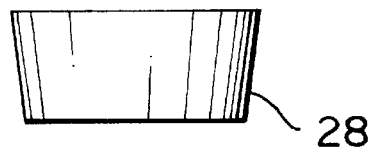
FIG. 3            FIG. 4
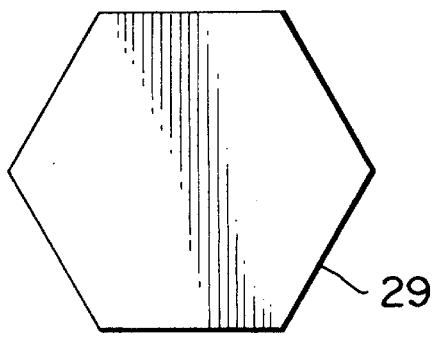
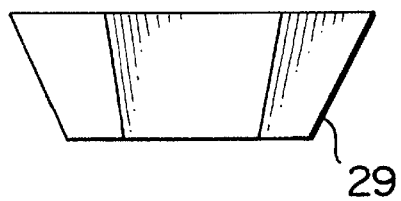
FIG. 5            FIG. 6
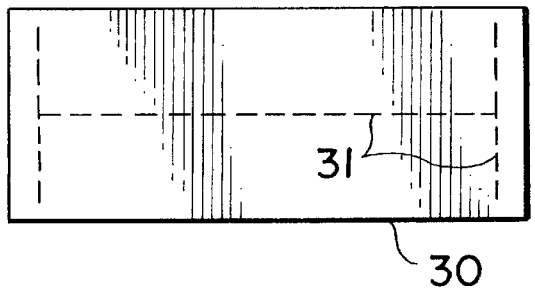
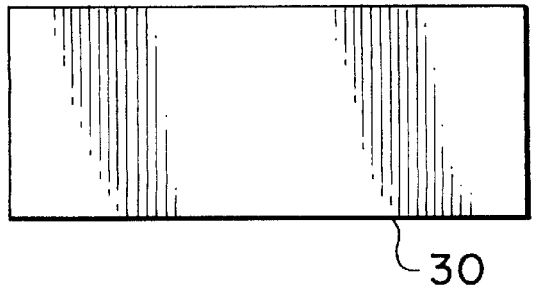
FIG. 7            FIG. 8 ical application Ser. No. 60/078,181, filed Mar. 16, 1998.

INDIVIDUAL SERVING SIZE CEREAL PACKAGE

CROSS-REFERENCE TO RELATED APPLICATIONS

This application is a continuation-in-part of application Ser. No. 09/098,962, filed Jun. 18, 1998, which claims the benefit of U.S. Provisional application Ser. No. 60/078,181, filed Mar. 16, 1998.

BACKGROUND OF THE INVENTION

1. Field of the Invention

This invention relates to ready-to-eat food products. More particularly, the invention relates to a self-contained, individual serving size cereal product.

2. Description of the Prior Art

Food products that require little or no preparation have been available to the consumer for many years. These food products include breakfast cereals that are pre-sweetened and/or pre-flavored, whereby it is necessary only to add milk or hot water, depending upon the type of cereal and the desired flavor, to prepare the cereal for normal consumption. Some breakfast cereals are intended to be eaten hot, and these must either be cooked or have hot water or hot milk added to them.

Many consumers eat breakfast cereals as a snack food, with or without the addition of milk. As reported in a recent issue of Business Week magazine, there is a growing trend to consume cereal at noon and at night, as well as more traditionally as a breakfast food. Many breakfast cereals may be eaten directly from the box, without any preparation time, except for the addition of milk or hot water, if desired, thus making it an exceptionally convenient food. Further, the average consumer is more health conscious than in the past, and breakfast cereals make a more healthy ready-to-eat snack than many other ready-to-eat snack foods. Pre-sweetened and pre-flavored breakfast cereals also make them more convenient for consumption straight out of the box, since it is not necessary to add sweeteners or flavorings to the cereal before eating it.

The convenience and nutritional value of cereal make it especially desirable as a food product. This is particularly true in countries where conditions limit the availability of many healthful foods, due at least in part to the lack of refrigeration. Ready-to-eat cereals can be stored without refrigeration, and especially if fortified with vitamins and minerals, could provide essential nutrition to large segments of the population in these countries. For instance, milk and other dairy products are an important source of calcium, but the absence of refrigeration makes it very difficult to provide milk as a part of the regular diet in these countries.

U.S. Pat. No. 3,494,769 describes a breakfast cereal suitable for use as cold cereal by the addition of milk, or as a hot cereal by the addition of hot water. The cereal is prepared by heating rolled oats to cook the starch and protein contained therein, applying liquid milk in sufficient quantity only to wet the oats and to distribute it evenly throughout the oat product, and then drying the wet product to crispness, producing a crunchy product. During the manufacturing process, the flaky or granular cereal is either sprayed or sprinkled with liquid milk in which sugar, salt, fruit juice puree, and/or flavoring materials are dissolved, whereby the mixture is absorbed by the oat flakes and evenly distributed throughout the body of the flakes. Cream, butterfat, or cream substitute may be added to the milk to improve the flavor and the texture of the product. The cream or dry cream substitute may be mixed with the milk or it may be added to the cereal in a conventional mixer after the milk containing the other additives has been added. If a dry cream substitute is used, it may be dusted onto the cereal while the mixer is operating. The amount of milk added to the cereal is determined by the desired crunchiness of the resulting product, i.e., if a relatively small amount of milk is used and little fruit is added, the product will be relatively soft and water absorptive and not crunchy, or if a higher proportion of milk with fruit is used to wet the cereal, which is thereafter dried, it is crunchy. There is no suggestion of the self-contained, individual serving size cereal package of the invention, and particularly with a dry milk product and other additives placed individually in the package.

An example of a pre-sweetened breakfast cereal is described in U.S. Pat. No. 4,089,984. This patent purports to overcome the difficulty in the prior art of sweetening cereals with fructose sweeteners. The use of fructose sweeteners, which are normally in a liquid state, was not practical before the invention described in this patent, since such coating resulted in a sticky, messy product. The teaching in this patent overcomes this difficulty and enables liquid fructose sweeteners to be used on cereal products, by covering or coating the sticky fructose coating with an edible powdered material to eliminate the stickiness. Examples of the powdered material are given as sucrose, lactose, dried corn syrup solids, corn starch, wheat starch, dried milk solids and/or dextrose. In the process described in this patent, the liquid sweetener is treated to evaporate a majority of the moisture from the liquid sweetener and then it is applied to the cereal pieces by using an enrober drum while the liquid sweetener is still at an elevated temperature and thus fluid. A limited amount of the powdered material is dusted onto the coated cereal pieces as cooling takes place. The liquid sweetener captures the powdered material, and the powdered material substantially eliminates the cohesiveness and stickiness of the coated pieces. There is no suggestion in this patent of the self-contained, individual serving size cereal package of the invention, and particularly with a dry milk product and other additives placed individually in the package.

A process for manufacturing a reconstitutable cereal is described in U.S. Pat. No. 4,874,624, in which water is added to pre-steamed flaked oatlets which are then blended together and fed to an extruder cooker to raise the temperature and pressure of the product. The exudate is cut into pellets which are formed into flakes on flaking rolls and dried to a moisture content of 7%. The flakes are blended with 25% by weight of the pre-steamed oatlets to form an instant water-reconstitutable cereal product. The product is therefore ready for eating without the need to be cooked, and may be prepared simply by the addition of hot water or milk. Additives such as trace nutrients, vitamins, wheat flour, bran, skimmed milk powder, whey powder, or other milk by-products, malt extract, honey, sweetening agents such as sugar or aspartame, sunflower seed, vegetable oil, salt or other flavoring agents may be added to the conditioned flakes. The prepared oatlets are described as having all the normal organoleptic properties of oats which are cooked in the traditional manner, and the major advantage is described as a cereal product which may be instantly reconstituted simply by the addition of hot water or milk. There is no suggestion in this patent of the self-contained, individual serving size cereal package of the invention, and particularly with a dry milk product and other additives placed individually in the package.

A creamy orange flavored snack cereal is described in U.S. Pat. No. 5,035,914. The food product described in this patent includes a popped cereal that includes a powdered dairy or dairy substitute product which simulates cream flavor, in combination with powdered orange or artificial orange flavor. The purpose of this patent is to provide a product which may be eaten as a snack without milk or liquid and yet has a "creamsicle" flavor. The patent describes two essential ingredients as being required in order to produce the invention. These are the constituent which creates the simulated cream flavor, and the constituent which creates the orange flavor. The cream flavor or creamy ice cream flavor is obtained by using powdered non-dairy cream substitutes such as, for example, coffee creamer or cream flavoring. The patent states that the food product may be eaten with milk, or used as a dry snack eaten like potato chips or other dry snacks. There is no suggestion in this patent of the self-contained, individual serving size cereal package of the invention, and particularly with a dry milk product and other additives placed individually in the package.

Other ready-to-eat or easily prepared food products are disclosed in U.S. Pat. Nos. 3,578,459, 3,992,556, 4,485,120, 4,585,664 and 4,755,390. These patents all relate to the use of various additives and/or manufacturing processes which enhance the nutritional value and/or quality, e.g., texture, flavor, etc., of the resultant product. For instance, U.S. Pat. No. 4,585,664 describes a dry instant rice porridge mix that is reconstitutable in milk, or which may be reconstitutable in water with the addition of dry milk solids. The non-fat dry milk solids are added to provide an amount of milk solids equivalent to the milk solids obtained in a conventional long-cook product, i.e., to provide an excess of milk solids in the rehydrated final ready-to-eat product. The conventional long-cook process evaporates water from the milk in which the rice is cooking and this results in an excess of milk solids, as compared with uncooked milk. Synthetic milk-like substances such as sodium caseinate and/or non-milk lipid sources may be used instead of non-fat dry milk solids. There is no suggestion in these patents of the self-contained, individual serving size cereal package of the invention, and particularly with a dry milk product and other additives placed individually in the package.

In conventional dry cereal products, nutrients are added to the cereal during the manufacturing process. Many of these nutrients deteriorate in the presence of heat and/or upon the passage of relatively short periods of time. Accordingly, some of the nutritional benefit of these additives is lost during manufacture and/or storage of the cereal. If a certain level of nutritional benefit is desired in the final product, then an excess amount of the nutrient must be added during the manufacturing process. This increases the cost of manufacturing the fortified cereal product, and leads to waste of the nutritional materials.

Some cereal products are packaged in convenient single serving sizes. These packages generally require the addition of milk if the flavor and consistency of a milk and cereal mixture is desired. Kellogg's "Breakfast Mates"™ cereal is an example of a cereal product marketed in a single serving size. This package comprises a box in which are packaged a container of dry cereal, a container of specially processed liquid milk, which does not require refrigeration prior to being opened, and a spoon. This package is quite convenient, in that it is self-contained. However, it requires the admixture by the consumer of separate components, and is relatively expensive to make.

Other single serving size cereal packages contain only the dry cereal product, which must be poured into a bowl and milk added if the flavor and consistency of a milk and cereal mixture is desired.

Many people eat cereals straight from the package, without the addition of milk. The practice of eating cereal products dry, as a snack food, without the addition of milk, results in loss of the nutritional benefits of milk. The flavor of a milk and cereal mixture is also lost.

Applicant is not aware of any prior art teaching of a self-contained, single serving size, ready-to-eat cereal package to which a quantity of dry milk product, such as powdered whole milk or a low-fat or non-fat dry milk product or dry powdered milk substitute, or any combination thereof, has been added, whereby it is necessary only to add water to reconstitute the milk, thereby producing a ready-to-eat cereal and milk combination that, in terms of taste, texture and appearance, is comparable to a conventional dry cereal product to which liquid milk has been added to prepare it to be eaten, or alternatively, which may be eaten straight from the box, without the addition of water, and which will have a flavor and nutritional value very much like that of cereal to which milk has been added. The prior art does not disclose anything comparable.

Thus, there is need for a single serving size cereal product that has a powdered whole milk or low fat milk or milk substitute added that may be reconstituted by the addition of water, or eaten straight from the box, so that the nutritional benefit and flavor of a cereal and milk combination may be produced without the necessity of adding liquid milk to the cereal to prepare it to be eaten.

SUMMARY OF THE INVENTION

The present invention overcomes the deficiencies of the prior art by providing a single serving size dry cereal product to which a dry, powdered milk product has been added. The dry powdered milk product, as used herein, is intended dried whole milk, low fat dry milk, non-fat dry milk, or dry milk substitute product, such as whey or soy or a combination of any of these, or acidolpholus or Lactaid reconstitutable in water, whereby the cereal may be eaten straight from the box without losing the flavor and nutritional benefit of milk, or alternatively, wherein it is necessary only to add water to obtain a cereal product that is comparable to that obtained with conventional cereals by the addition of liquid milk. The dried milk and milk substitute products may include MILKMAN®, sold by Familiar Foods, Inc., of City of Industry, California, or other commercially available product, including casein proteins of milk, i.e., non-fat dry milk, caseinates, caseins, milk protein concentrates and milk protein isolates, high-calcium fractionated whey, and whey protein concentrates.

The cereal of the invention may be stored just as any other dry cereal product, making it particularly suitable for prolonged storage under non-refrigerated conditions. The dry milk-coated cereal of the invention is thus convenient for school, office and home use, and may be dispensed in vending machines. Since water is generally available even when milk is not, the cereal of the invention could be distributed in third world countries to provide a flavorful food having the nutritional benefits of cereal and milk, without the need for preserving and storing regular milk products or of using the relatively expensive liquid milk product as used in the Kellogg's cereal package, for example. The cereal package of the invention is also particularly well adapted for use on camping trips or by the military or in disaster relief, etc.

Further, packaging of the cereal product of the invention in individual serving size boxes, with or without the inclusion of a plastic spoon, makes it particularly convenient to use, and it is necessary only to have access to water in order to produce a cereal immersed in milk, without requiring storage and access to regular milk, or eating utensils.

The powdered milk may be applied to the cereal pieces as a coating, if desired, either while the cereal pieces are still wet or damp during the manufacturing process, or after the cereal pieces have been dried, as more fully explained in applicant's prior application serial number 09/098962, which is incorporated in full herein. Conventional equipment may be used to dust the cereal pieces with the powdered milk product. Alternatively, dried cereal pieces may be lightly misted or wetted with water, sweetener, flavoring, etc. and the dry powdered milk product then dusted onto the cereal pieces, after which the coated cereal pieces are dried and packaged.

To enhance adherence of the dry milk product to the cereal pieces, the milk product may be processed to have the consistency of flour. This fine, dust-like texture of the coating is not as easily dislodged from the cereal pieces as would be a coarser material.

As a further alternative, the powdered milk product can be made slightly damp so that it will adhere to the dry cereal pieces, and then sprayed onto the dried cereal pieces as they fall or are tumbled through the coating spray. The thus-coated cereal pieces can then be dried and packaged.

In a preferred embodiment, the dried milk product is simply added individually to the package, without the need for coating the cereal pieces during manufacture. At least some of the cereal pieces will be coated with the dried milk product when the milk product is added to the package at the time of manufacture. Additional coating can be obtained by gently shaking the package just prior to eating the cereal. Of course, if water is going to be added to reconstitute the milk, it is not necessary that the individual cereal pieces be coated, since thorough mixing will be achieved in the reconstituted milk.

By packaging the cereal and milk product as described above, the expense and extra processing steps required to coat the milk onto the cereal pieces can be avoided.

Further, vitamins, minerals and other nutrients can simply be added to the package without the need for coating or impregnating the individual cereal pieces with the nutrients. This approach eliminates the degradation and loss of nutrients that occur during conventional manufacturing processes. The nutrients can be micro-encapsulated to prolong their shelf life. Similar steps can be taken with sweeteners, flavors and other additives, thereby substantially reducing the complexity and cost of manufacturing fortified and pre-sweetened and/or flavored cereals.

In an alternative embodiment, the dry milk product of the invention may be used as a carrier for the nutrients or other additives. Further, various products such as acidolpholis or Lactaid may be substituted for milk (dairy) products to produce a cereal that can be eaten by persons who are lactose-intolerant.

A milk substitute such as whey or soy, for example, can be mixed with skim milk or non-fat dry milk product to minimize the cost but still obtain a desirable flavor.

BRIEF DESCRIPTION OF THE DRAWINGS

The foregoing, as well as other objects and advantages of the invention, will become apparent from the following detailed description when considered in conjunction with the accompanying drawings, wherein like reference characters designate like parts throughout the several views, and wherein:

FIG. 3 is a top plan view of an alternate shape of container;

FIG. 4 is a side view in elevation of the container of FIG. 3;

FIG. 5 is a top plan view of a hexagonally shaped container for packaging the cereal according to the invention in individual serving sizes;

FIG. 6 is a side view in elevation of the package of FIG. 5;

FIG. 7 is a top plan view of a rectangularly shaped container for packaging individual serving sizes of the cereal according to the invention; and FIG. 8 is a side view in elevation of the package of FIG. 7.

DETAILED DESCRIPTION OF THE PREFERRED EMBODIMENTS

Figure 1:
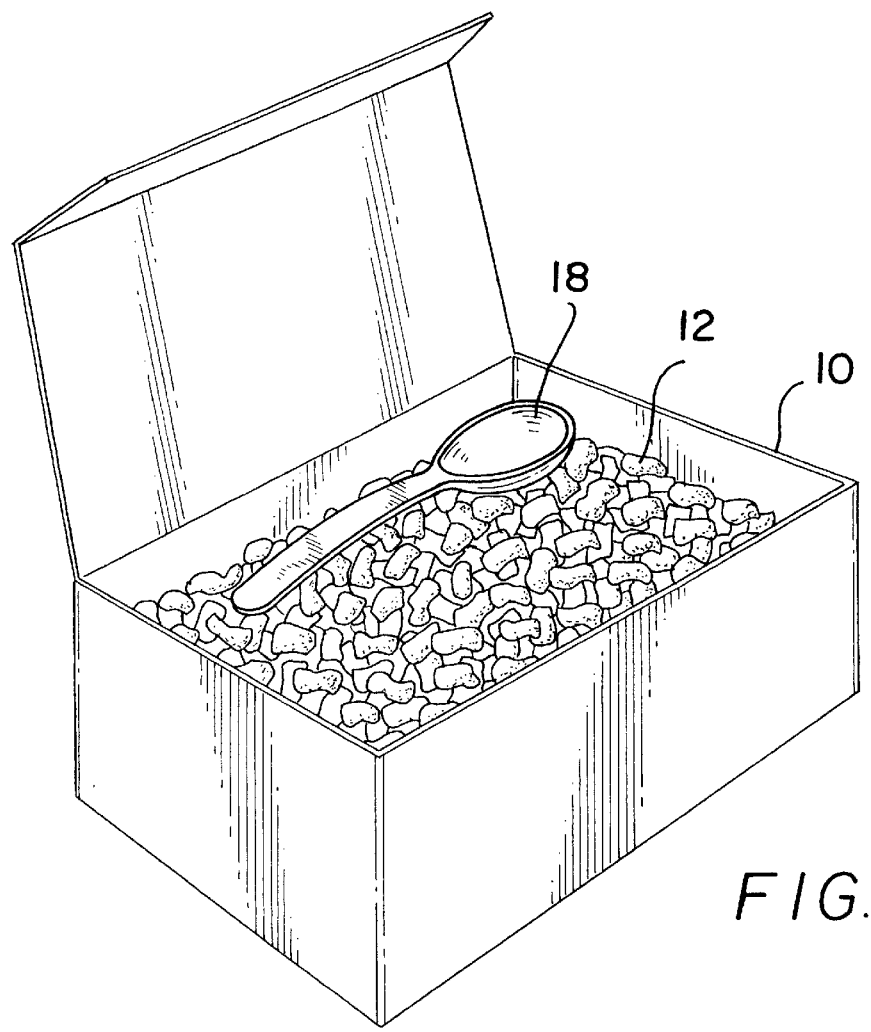
FIG. 1 is a top perspective view of a single serving size cereal package according to the invention, showing the package opened and illustrating how a spoon may be packaged with the cereal.

In accordance with the present invention, individual serving sizes of cereal are packaged with a dry milk product, such as powdered whole milk, or a low-fat or non-fat dry milk, or a dry milk substitute product, that is reconstitutable in water. The dry milk product may be coated onto the cereal pieces as more fully explained in copending application Ser. No. 09/098,962, or individually added to the package as a separate ingredient. Similarly, although nutrients and other additives could be added to the cereal in accordance with conventional practice, all of the advantages of the invention are achieved only if they are added to the package individually, as described hereinafter.

Addition of the milk product and nutrients and/or other additives as separate ingredients in the package substantially simplifies the manufacturing process. Moreover, addition of the nutrients as separate ingredients eliminates the degradation of the nutrients that occurs during conventional processes. The nutrients and other additives may even be micro-encapsulated, improving their shelf life.

The powdered milk product, whether applied as a coating or as a separate ingredient added to the package, should comprise dried whole milk or a low-fat dry milk or dry milk substitute product. Dried skim milk and non-fat milk products can be used, although they do not produce the same flavor or appearance as cereal coated with dried whole milk or low fat milk. Similarly, coffee creamers and similar products should not be used since they do not readily dissolve in cold water. They also do not provide the same flavor as dried whole milk. A suitable powdered milk product may be obtained from the low fat dry milk product that is sold by Familiar Foods, Inc., of City of Industry, California, under the trademark MILKMAN®. This product contains 5% milk fat before adding water, and ½% milk fat after water is added. It also contains a small amount of cream for added flavor. This product, as well as other commercially available dried milk products, are generally granular to avoid lumping and to obtain rapid dissolution when added to water. For use in the present invention, these products are further processed to a flour-like consistency, which results in better adherence between the coating and the cereal pieces, but which also readily dissolves in water, without lumping, because the powder is in a layer distributed over the surface of the cereal pieces. Of course, if the milk product is added as a separate ingredient to the package, it could be left in its granular form to facilitate dissolving when water is added. However, to obtain the flavor and nutritional benefit of milk when the cereal is eaten dry, the milk product should be processed to a powder so that it more readily adheres to and coats the cereal pieces in the package. However, instead of powdered milk, dry milk pellets could be used with some cereals, such as shredded wheat, if desired.

Best results are obtained when the dried milk or milk substitute is added in the ratio of from about six percent up to about thirty-two percent (6%–32%), by weight, of the cereal, although other amounts may be acceptable on some cereals, depending upon the structure and flavoring of the cereals.

If a milk substitute such as whey or soy is added to dry skim milk or non-fat milk products to enhance their flavor and appearance, the ratio of substitute to non-fat milk is preferably in the range of 15% to 25%, by weight.

Additional nutrients can be mixed in the dried milk or milk substitute, which then serves as a carrier, or applied separately and introduced into the package when the milk or milk substitute is applied to the package. Sweeteners and flavorings can be similarly applied. By applying the nutrients, sweeteners and/or flavorings to the package at the end of the manufacturing process, many of the problems associated with loss of nutrients and detrimental change to flavorings caused by heat or other processing steps are avoided.

In accordance with the invention, the cereal is packaged in individual serving size containers 10, and includes the cereal 12, a dry milk product 14 that is reconstitutable in water, nutrients 16, a spoon 18, and if desired, sweeteners, flavorings and other additives (not shown).

A predetermined quantity of dry cereal pieces 12 are first added to the container 10, and dry milk product 14 and nutrients 16 then added. The dry milk product and nutrients or other additives will filter down through the cereal pieces, with some of it adhering to the cereal pieces. A spoon 18 may be placed in the container 10, after which the container is closed prepatory to being shipped for display and sale.

The nutrients 16 may be encapsulated to prolong their shelf life, and sweeteners, flavorings, or other additives similarly may be encapsulated.

As roughly illustrated in the drawings, the container should not be filled completely in order to leave room for the addition of water to reconstitute the milk, since it is intended that the container function as a serving bowl out of which the cereal may be eaten.

Figure 2:
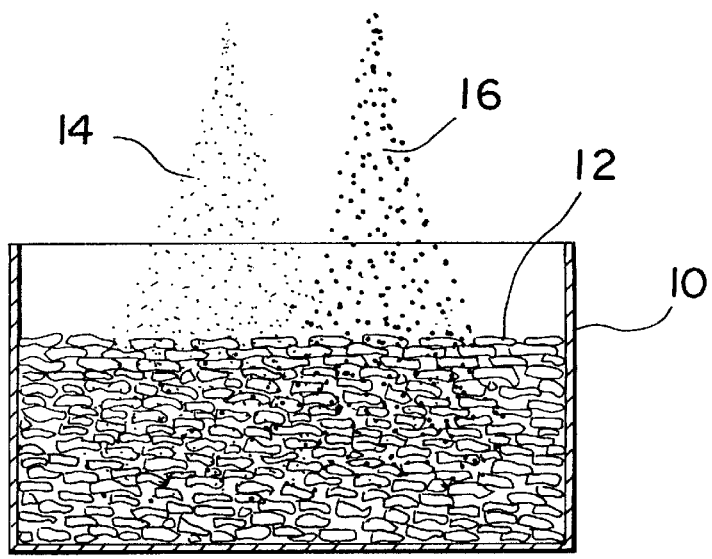
FIG. 2 is a schematic side view in section of a package according to the invention, showing how dry milk product and nutrients, flavoring and other additives may be introduced into the package.

A variety of different shaped containers are shown in FIGS. 3–8 for packaging the cereal in individual serving sizes. FIGS. 2 and 3 show a circular container 20 having slightly tapered side walls. FIGS. 4 and 5 show a hexagonally shaped container 22, having more sharply sloping side walls. FIGS. 6 and 7 show a rectangular shaped container 24 which may have perforations 25 formed in its top wall to facilitate opening of the wall. In this form of the invention, as well as in the previously described forms, the container may be suitably treated to make it water tight, and after it is opened water and/or milk may be added directly to the package so that the cereal can be eaten directly from the package. For example, if it is intended to add water directly to the package to prepare the cereal to be eaten, the package can be lined with a liquid impervious material, such as wax, waxed paper, etc. Alternatively, the walls of the container can be impregnated or otherwise treated to make them liquid impervious.

A finely powdered dry milk or milk substitute is desired, having the consistency of flour, for better adherence to the cereal pieces, although more granular consistencies, or even small pellets, may be used on some cereals, such as shredded wheat, for example. In these instances, it is probably more accurate to describe the milk product as imbedded in the interstices of the structure of the cereal pieces, but this is intended to be covered by the term "coating" or "coated" as used herein. Of course, it is not necessary that the dry milk product coat the cereal pieces at all.

The following examples are illustrative of milk-coated cereals produced in accordance with the invention.

EXAMPLE 1

Ninety (90) grams of commercially available pre-sweetened cereal flakes, Honey Frosted Wheaties®, by General Mills, Minneapolis, Minn., were lightly misted with water to dampen them, and then dusted with sixteen (16) grams of Milkman® powdered milk, by Familiar Foods, Inc., processed to a flour-like consistency, until the flakes became uniformly coated with the powdered milk. The flakes were then dried and placed in a bowl and water was added, resulting in reconstitution of the milk and producing an excellent product that exhibited an appearance and flavor comparable to that of a flaked cereal, uncoated, placed in a bowl and liquid milk added.

EXAMPLE 2

Ninety (90) grams of commercially available toasted oat cereal sold under the name Cheerios®, by General Mills, Minneapolis, Minn., was lightly misted with water to dampen it, and then dusted with sixteen (16) grams of Milkman® dry powdered milk, by Familiar Foods, Inc., processed as in Example 1, until the pieces of cereal became uniformly coated with the powdered milk. The pieces of cereal were then dried, placed in a bowl and water added to reconstitute the milk. An excellent product resulted, with a taste and appearance comparable to that of an uncoated cereal placed in a bowl with liquid milk.

EXAMPLE 3

In this example, one hundred fifty (150) grams of commercially available bite-size shredded wheat was sprayed with water to dampen it, and then dusted with ten (10) grams of Milkman® dry powdered milk, in its commercially available consistency, and gently tumbled until the pieces of cereal were substantially uniformly coated with the powdered milk. The pieces of cereal were then dried, placed in a bowl and water added to reconstitute the milk. The resultant product was comparable to that obtained by adding liquid milk to uncoated shredded wheat.

EXAMPLE 4

In this example, fifteen and eight-tenths (15.8) grams of Cocoa Puffs® were lightly misted with water to dampen them and then dusted with five and eight-tenths (5.8) grams of Milkman® dry powdered milk, processed as in Example 1, and gently tumbled until the pieces of cereal were substantially uniformly coated with the powdered milk. The pieces of cereal were then dried, placed in a bowl and water added to reconstitute the milk. The resultant product was excellent.

Good adhesion of the dried milk product to the cereal pieces perhaps may be due at least in part to partial dissolving of the dried milk and consequent bonding of it to the dampened cereal pieces.

Although specific examples have been given above, the dried milk and milk substitute products may comprise any commercially available product, including casein proteins of milk, i.e., non-fat dry milk, caseinates, caseins, milk protein concentrates and milk protein isolates. Further, although the dry milk product was coated onto the cereal pieces, it is not necessary to coat the cereal in order to achieve the objects of the present invention.

Caseinates and milk protein concentrates, in particular, enable the cereal to be calcium-fortified because they make insoluble calcium dispersable and suspendable. Depending upon requirements, calcium levels of these ingredients can range between 2.7% to 15.0% of total weight to provide 100% of the RDI in some food systems.

A high-calcium fractionated whey can also provide a source of calcium-fortification. This source of calcium provides the highest relative bioavailability in rats, as compared with three other common calcium sources. Whey protein concentrates are a particularly good source because of their high solubility over a wide pH range and their high protein content.

By packaging the nutrients and other additives in accordance with the invention, some materials may be added to the cereal that are not capable of being added in conventional processes, or at least may be added more easily.

Virtually any material may be added, as a separate ingredient, when the process of the invention is followed, including medications, energy enhancers, flavors, aromas, etc. Any or all of these can be encapsulated, thereby enabling their use, or prolonging their efficacy.

A cereal product in accordance with the invention may be conventionally packaged, and does not require storage or handling any different than that of an uncoated cereal.

While particular embodiments of the invention have been illustrated and described in detail herein, it should be understood that various changes and modifications may be made to the invention without departing from the spirit and intent of the invention, as defined by the scope of the appended claims.

What is claimed is:

1. A dry, ready-to-eat, single serving cereal package comprising:
    a single-serving-size container;
    a single-serving-size quantity of dry cereal pieces in the container;
    a separate quantity of dry powdered milk product individually placed in the container with the cereal, reconstitutable in hot or cold water, said milk product having a consistency selected in relation to the surface texture of the cereal so that the milk product can adhere to the cereal pieces, whereby the cereal pieces will have a flavor and nutritional value comparable to cereal to which liquid milk has been added, whether eaten dry or wet; and
    a quantity of additives in the container with the cereal and the dry milk product to enhance the nutrition, flavor and/or sweetness of the cereal.

2. A cereal package as claimed in claim 1, wherein: the additives are encapsulated in small pellets.

3. A cereal package as claimed in claim 1, wherein: the ratio of dry milk product to cereal is between 6% and 32%, by weight.

4. A cereal package as claimed in claim 1, wherein: nutrients are mixed with the dry milk product for application to the cereal pieces along with the dried milk or milk substitute.

5. A cereal package as claimed in claim 1, wherein: the dry milk product has the consistency of flour to promote adherence thereof to the cereal pieces.

6. A single serving cereal package as claimed in claim 1, wherein:
    the dry powdered milk product is selected from the group consisting of dried whole milk, low fat dry milk, non-fat dry milk, whey, soy, acidolpholus, lactaid, caseinates, caseins, milk protein concentrates, milk protein isolates, calcium-fortified milk protein concentrates, and high-calcium fractionated whey, and a combination of any of these.

7. A single serving cereal package as claimed in claim 1, wherein:
    the dry cereal pieces have a rough, heavily textured surface to promote adherence thereto of the dry powdered milk product.

8. A process for preparing a ready-to-eat cereal comprising:
    placing a quantity of dry cereal pieces in a container;
    separately placing a quantity of dry powdered milk product in the container with the cereal pieces, said dry powdered milk product being reconstitutable in water, said milk product having a consistency selected in relation to the surface texture of the cereal so that the milk product can adhere to the cereal pieces, whereby the cereal pieces will have a flavor and nutritional value comparable to cereal to which liquid milk has been added, whether eaten dry or wet; and
    placing a quantity of additives in the container with the cereal and the dry milk product to enhance the nutrition, flavor and/or sweetness of the cereal.

9. A process as claimed in claim 8, wherein: the pieces of cereal, the dry milk product, and the additives are individually added to the container.

10. A process as claimed in claim 9, wherein: the cereal pieces are first added to the container, and the dry milk product and the additives are then added.

11. A process as claimed in claim 10, wherein: the additives are encapsulated in small pellets.

12. A process as claimed in claim 8, wherein: nutrients are mixed with the dry milk product, whereby the dry milk product serves as a carrier for the nutrients.

13. A process as claimed in claim 8, wherein: the dry milk product has the consistency of flour to promote adherence thereof to the cereal pieces.

14. A process for preparing a ready-to-eat cereal as claimed in claim 8, wherein:
    the dry powdered milk product is selected from the group consisting of dried whole milk, low fat dry milk, non-fat dry milk, whey, soy, acidolpholus, lactaid, caseinates, caseins, milk protein concentrates, milk protein isolates, calcium-fortified milk protein concentrates, and high-calcium fractionated whey, and a combination of any of these.

15. A process for preparing a ready-to-eat cereal as claimed in claim 8, wherein:
    the dry cereal pieces have a rough, heavily textured surface to promote adherence thereto of the dry powdered milk product.

16. A process of preparing a dry, ready-to-eat, single-serving-size cereal package, comprising the steps of:

providing a single-serving-size container;

introducing into the container a single-serving-size quantity of dry cereal pieces; and introducing into the container during manufacture of the package a predetermined quantity of dry powdered milk product reconstitutable in hot or cold water, whereby at least some of the dry powdered milk product can adhere to the dry cereal pieces so that the cereal will have a flavor and nutritional value comparable to cereal to which liquid milk has been added, whether the cereal is eaten dry or wet.

17. A process as claimed in claim 16, including the step of:

adding a quantity of nutritional supplements to the package along with the cereal and powdered milk product.

18. A process as claimed in claim 17, including the steps of:

first introducing into the package the dry cereal pieces; and then introducing into the package over the cereal pieces the quantity of dry powdered milk product.

19. A process as claimed in claim 16, including the steps of:

first introducing into the package the dry cereal pieces; and then introducing into the package over the cereal pieces the quantity of dry powdered milk product.

20. A process as claimed in claim 16, wherein:

the dry powdered milk product has the consistency of flour.

21. A process as claimed in claim 18, wherein:

the dry powdered milk product has the consistency of flour.

* * * * *